United States Patent [19]

Kawakami et al.

[11] Patent Number: 4,897,804
[45] Date of Patent: Jan. 30, 1990

[54] DATA PROCESSING DEVICE WITH SCREEN SEPERATED INTO LINE FORMAT AREA AND DATA DISPLAY AREA

[75] Inventors: Yasushi Kawakami, Nagoya; Fukue Obata, Yokkaichi; Kayoko Makihara, Kamagori; Shiro Yamada, Kasugai; Minoru Oishi, Nagoya; Yoshinari Morimoto, Nagoya; Atsuko Kawasumi, Nagoya; Kazuko Nakagawa, Chita; Yukimi Mizutani, Ichinomiya, all of Japan

[73] Assignee: Brother Kogyo Kabushiki Kaisha, Japan

[21] Appl. No.: 73,971

[22] Filed: Jul. 15, 1987

[30] Foreign Application Priority Data

Jul. 15, 1986 [JP] Japan .................. 61-165777
Jul. 15, 1986 [JP] Japan .................. 61-166273

[51] Int. Cl.⁴ .................. G06F 15/20; G06F 3/09
[52] U.S. Cl. .................. 364/521; 340/709; 340/723
[58] Field of Search ...... 364/900 MS FILE, 518–522, 364/523; 340/709, 727, 723

[56] References Cited

U.S. PATENT DOCUMENTS

| | | | |
|---|---|---|---|
| 3,648,271 | 3/1972 | McConnell et al. | 340/721 |
| 4,370,645 | 1/1983 | Carson et al. | 340/709 |
| 4,495,491 | 1/1985 | Postl | 340/709 |
| 4,648,047 | 3/1987 | Berkland et al. | 364/519 |
| 4,677,571 | 6/1987 | Riseman et al. | 364/519 |

FOREIGN PATENT DOCUMENTS 0066674  3/1982  European Pat. Off. .

OTHER PUBLICATIONS

IBM Technical Disclosure Bulletin, vol. 27, No. 11 Apr. 1985.

Primary Examiner—Gary V. Harkcom
Assistant Examiner—H. R. Herndon
Attorney, Agent, or Firm—Kane, Dalsimer, Sullivan, Kurucz, Levy, Eisele and Richard

[57] ABSTRACT

In a data processing device such as a word processor comprising input means for inputting character data and format data, display means for displaying the input data on a screen, and means for processing the input data and displaying the processed data on the display means, the screen on the display means is separated into a line format area for displaying line format data and other area for displaying the other, and the processing device is provided with means for shifting the data displayed on the line format area relative to the data displayed on the other area.

6 Claims, 9 Drawing Sheets

FIG. 12 (1)
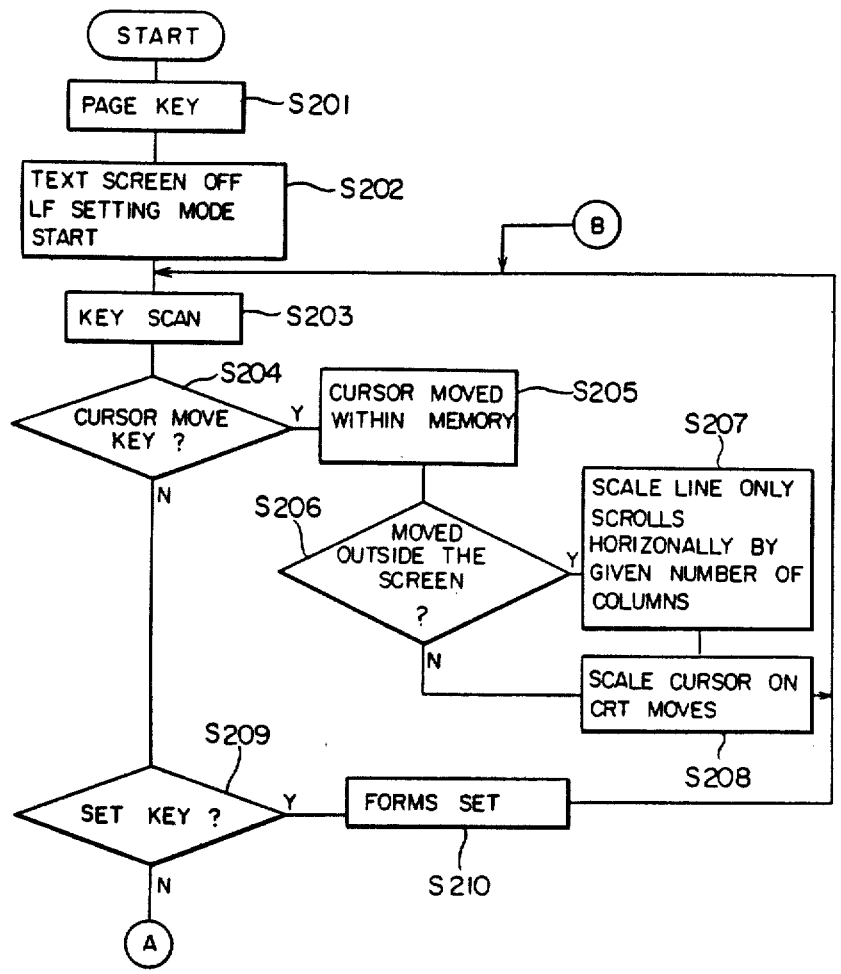

FIG. 12 (2)
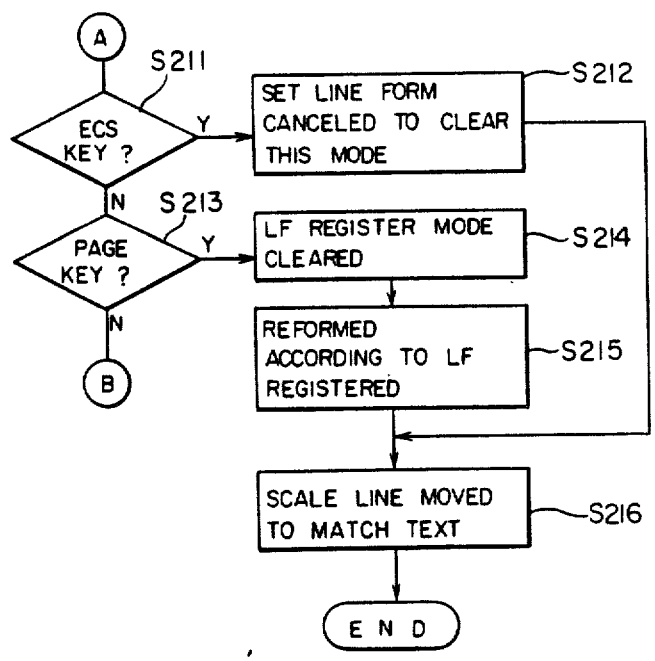

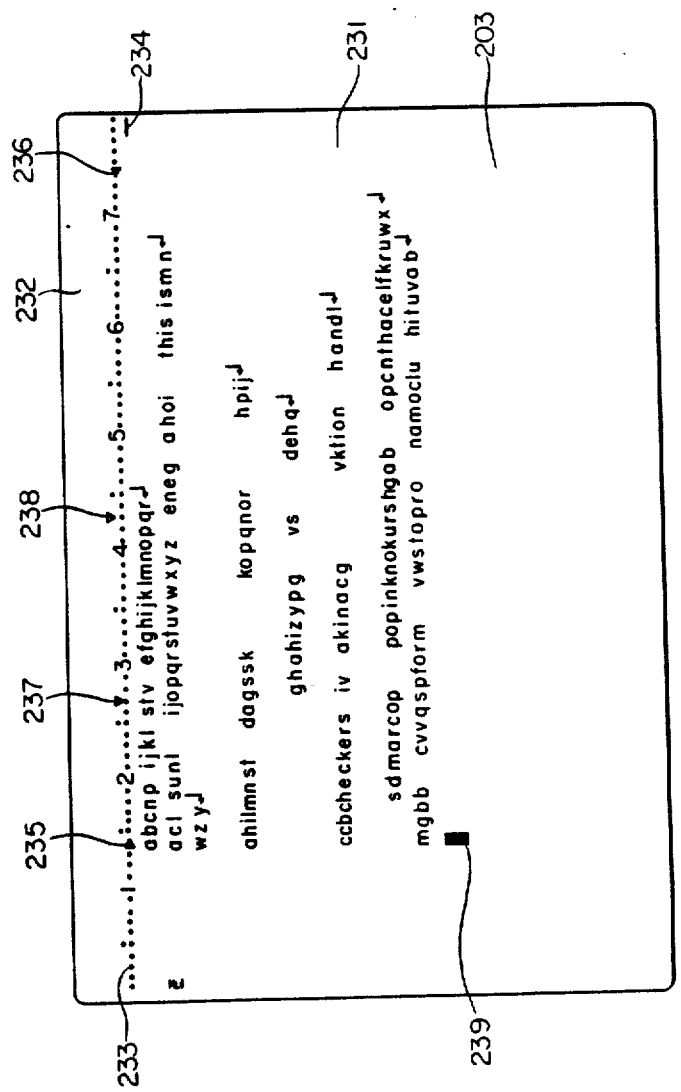

DATA PROCESSING DEVICE WITH SCREEN SEPERATED INTO LINE FORMAT AREA AND DATA DISPLAY AREA

BACKGROUND OF THE INVENTION

The present invention relates to a data processing device such as electronic typewriter, word processor and computer.

In conventional data processing devices, there is usually provided PS (proportional spacing) printing facility for printing PS type such as "i" and "w" with a greater or smaller moving distance of a printing head than for the standard type, but such PS characters are displayed on a screen display at an equal column spacing as for standard characters.

With the above data processing devices, the character display position on the display screen is out of alignment with the actual printing position, so that it is necessary to provide some way of supplying the operator with an actual printing image thereof.

As one measure for this, the printing position can be numerically shown on the display screen, however it is difficult to grasp digital information by way of an image. It has been therefore proposed to display a scale S, as illustrated in FIGS. 8 to 12, showing the input range of one line, on which the printing position is indicated by a scale cursor SK. Each dot of the scale S indicates a column of standard printing spacing and every tenth dot is marked with scale figures. The scale cursor SK is placed on the column which is specified by dividing the sum of character spacings on one line by the standard printing spacing and adding 1 to the quotient.

For instance, assuming that the standard printing space is 10 pitch (1 pitch=1/20 inch), let us input 10 characters of standard 10-pitch printing spacing (such as A, B, C and D). The scale cursor SK is then positioned on the same column (column 11) on the display screen as the text cursor TK indicating the input position of the characters, as illustrated in FIG. 8.

When, on the other hand, 10 characters of 16-pitch spacing (such as W) are entered, the text cursor TK is positioned on the column 11, while the scale cursor SK is on the column 17 (=16×10÷10+1) as illustrated in FIG. 9.

When 10 characters of 6-pitch spacing (such as i) are entered, the text cursor TK is positioned on the column 11, while the scale cursor SK is on the column 7 (=6×10÷10+1) as illustrated in FIG. 10.

Consequently, when multiple texts including a number of PS types are entered into one line, the scale cursor SK is likely to go outside the display screen.

Assuming, for instance, a device in which one line accepts data input of 254 columns is provided with a display medium (e.g. CRT) having a display width of 80 columns, when 150 of the characters "W" are entered, the text cursor TK is placed on the column 151 of the display screen as illustrated in FIG. 11. The scale cursor SK, on the other hand, goes to column 241 (=16×150÷10+1) which is ahead of the text cursor TK by 90 columns, so that the display screen is unable to display the scale cursor SK.

When 230 of the characters "i" are entered, while the text cursor TK is positioned on column 231 on the screen as illustrated in FIG. 12, the scale cursor SK is on column 139 (=6×230÷10+1) which is behind the text cursor TK by 92 columns. As a result, the screen no longer allows display of the scale cursor SK.

On the other hands, in conventional data processing devices, when the formatting mode is entered to change the format during editing a text, shifting the text cursor causes the whole text on the display screen to horizontally scroll at one time.

Therefore, problems have been encountered that operators troubled by disturbing screen flickering, and such as some time is required for processing using an internal circuit as of microprocessor to scroll the whole text and re-edit it, which causes some time lag in entering the next keystroke, resulting in a longer time required for editing operation.

SUMMARY OF THE INVENTION

Accordingly, it is an object of the invention to provide an improved data processing device capable of constantly keeping a scale cursor on a display screen so that an operator can be always aware of the actual printing position of the displayed data.

Another object of the invention is to provide a data processing device capable of keeping the text data on the display screen to stand still even if the data displayed on a format area are shifted when a scale cursor is moved under the formatting mode.

For the above purpose, according to this invention, there is provided a data processing device comprising input means for inputting character data and format data, display means for displaying the input data on a screen, and means for processing the input data and displaying the processed data on said display means, the improvement in which the screen on said display means is separated into a text area for displaying the character data and a format area for displaying format data, and said processing device is provided with shift means for shifting the data displayed on said format area relative to the data displayed on said text area.

In a preferred embodiment, said data processing device comprises a data memory for storing various data which are entered from said input means, said data displayed in said line format area designates a scale which indicating the input range of one line with its one column corresponding to the standard printing spacing, printing means for printing the data onto the printing medium at varying printing space in dependence on the corresponding character width, a printing spacing memory for storing the printing spacing of each character, printing space summing means for calculating the sum of corresponding printing spaces of the characters to be entered from the beginning to a predetermined position of said input range on said display means, column number calculating means for calculating the number of columns by dividing said sum of printing spaces by said standard printing space, and said shifting means comprising means for shifting said scale so that the column which is positioned closer to the end of line by said number of columns from the column corresponding to the beginning of said input range is placed in a position corresponding to said predetermined position.

In another aspect of this invention, there is provided a data processing device comprising input means for inputting character data and format data, display means for displaying the input data on a screen, and means for processing the input data and displaying the processed data on said display means, the improvement in which the screen on said display means is seperated into a line format area for displaying line format data and another area for displaying other data, and said processing device is provided with shift means for shifting the data displayed on said line format area relative to the data displayed on said other area and means for bringing the screen of said other area to stand still while keeping the screen of said other area to stand still while keeping the screen of said line format area movable, when a format setting mode is entered.

BRIEF DESCRIPTION OF THE ACCOMPANYING DRAWINGS

Figure 14:
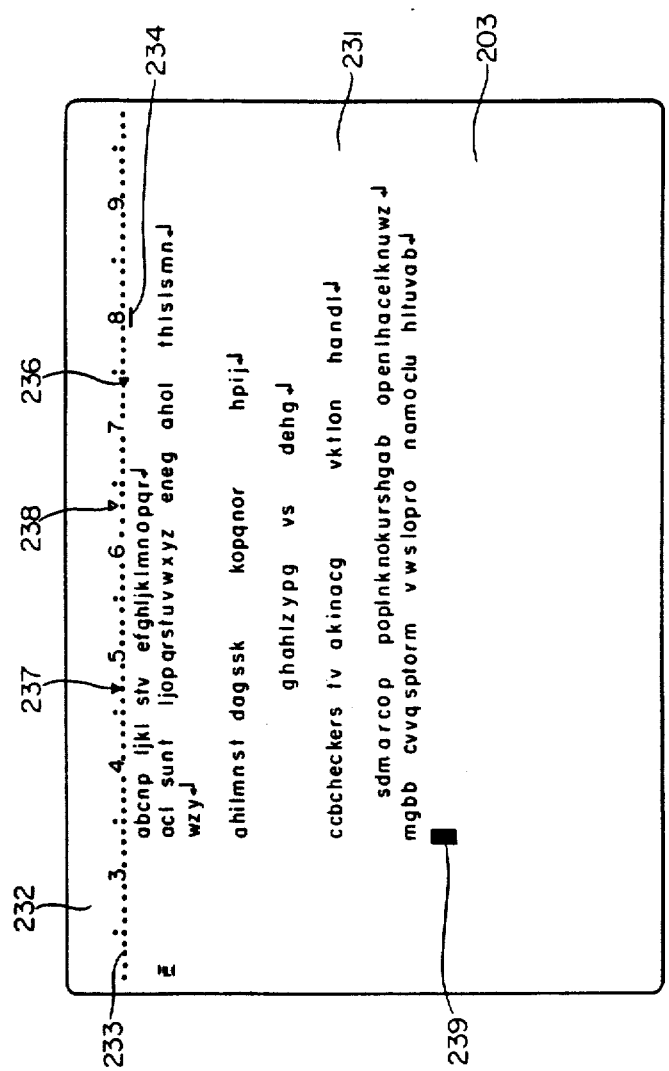

FIGS. 12(1) and 12(2) are flow charts showing the control operation for the line format setting mode; and FIGS. 13 and 14 are illustrative views of the display screen of the word processor embodying the invention.

DESCRIPTION OF THE PREFERRED EMBODIMENT

Figure 1:
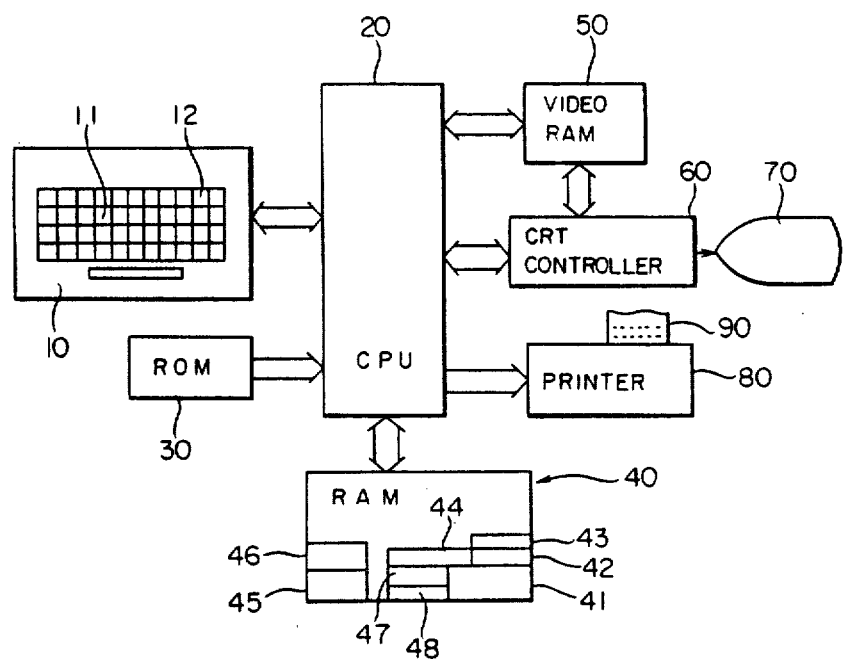
FIG. 1 is a block diagram of a word processor embodying the invention.

FIG. 1 shows the block diagram of the word processor embodying the invention, wherein a keyboard 10 includes a character keys section 11 consisting of alpha and numeric keys and various symbol keys, and a function keys section 12 including a space key, back space key, return key, cursor move keys, margin set keys, space keys, escape keys and so on.

The key code corresponding to the key strokes is sent from the keyboard 10 to a CPU (Central Processing Unit) 20 through operation of these keys.

The CPU 20 executes operations required for processing input and output character and similar data and editing procedure, in accordance with program data stored in a ROM (Read Only Memory) 30. It also places a text cursor and a scale cursor on the same column on a CRT (Cathode Ray Tube) 70 which serves as a display medium. The CPU 20 further operates to send printing-head move signals in response to the character width and type selection signals dependent on the characters to a printing mechanism 80. The CPU 20, ROM 30, RAM (Random Access Memory) 40, video RAM 50, CRT controller 60 and printing mechanism 80 are all interconnected via a common bus for transfer of control signals, data signals and address signals.

The ROM 30 contains character spacing data of each character, other than the program data mentioned above.

Figure 3:
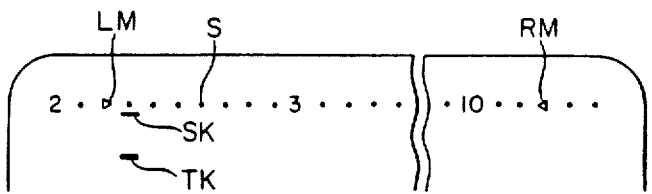
FIGS. 3 through 6 are illustrative views of the display screen.

The RAM 40 is provided with a text memory 41 into which the data such as characters and symbols to be entered from the keyboard 10 is stored, a text cursor pointer 42 which stores the data indicating the position of the text cursor (line and column), a scale memory 43, a total character spacing counter 44, a scale move counter 45 and a scale cursor column counter 46. The total character spacing counter 43 retains the value of total character spacing of the characters entered to the left side of the text cursor on the line where it exists. There is a scale S, as illustrated in FIG. 3 indicating the number of columns on top area of the CRT 70, with the scale cursor SK shown under the scale S which is movable horizontally along the scale S to indicate the data printing position (column). The scale S is, on display, horizontally moved in dependence on the spacing of the characters to be entered as described later in more detail. The number of columns through which the scale S has been moved with respect to the text display is stored in the scale move counter 45. The column on which the scale cursor SK is positioned is written into the scale cursor column counter 46.

The text cursor pointer 42 and the scale cursor column counter 46 keep in memory the addresses of the text cursor TK and the scale cursor SK stored in the video RAM. The scale memory 43 retains data for dots, figures and margin marks (triangular shape) forming the scale S.

The video RAM 50 is a display buffer which temporarily stores the data for one screen to be displayed on the CRT 70 and its memory address one by one corresponds to the display address on the display screen of the CRT 70. The CRT controller 60 is a unit to display alphabetical or other characters on the CRT 70 which is provided with a character generator retaining the type font (type pattern) and is also connected to the video RAM 50.

The CRT controller 60 displays characters at an equal spacing (standard spacing) on the CRT 70. The data sent from the keyboard 10 is written into the text memory 41 as well as into the specified address of the video RAM 50 by means of the CPU 20. At this time, the CRT controller 60 immediately reads the written data from the video RAM 50 and displays the corresponding type font within the character generator on the CRT 70, while operating to indicate the text cursor TK on the column next to the column on which the character is shown.

The printing mechanism 80 has a printing head, not shown, horizontally movable in accordance with printerhead moving signals sent from the CPU 20 depending upon the character spacing. It is possible to use, as printing mechanism, thermal printer, wire-dot printer and type-wheel printer.

In the word processor as above constructed, the processing for moving the scale S for alignment of the text and scale cursors TK, SK is described below with reference to the flow chart shown in FIG. 2 and the illustrative views of the screen display in FIGS. 3 to 6.

First, in order to set a desired printing space, a left margin LM and a right margin RM are placed at predetermined positions of the scale S on the screen using the margin move keys. In FIG. 3, the left margin LM is on column 22 of the scale S, and the right margin RM on column 103, with the printing spacing assumed at 80 column=800 pitch. The screen then scrolls to the left by 20 columns. Although the printing spacing can be arbitrarily selected on the scale S between the both margins LM and RM, it is preferable to set it within 60% of the number of columns with in the text area. This is because, when the character i with a minimum spacing (=6 pitch) is repeatedly typed into one line of the text area, if there are some columns beyond 60% of the number of columns in the text area between the margins LM and RM, the scale cursor SK does not reach the right margin RM even if the character i is typed up to the last column on the line of the text area.

With no character data entered, the text cursor TK is positioned on column 23 on the first line of the text area as shown in FIG. 3. The scale cursor SK is placed on column 23 of the scale S and is in alignment with the text cursor TK.

Figure 4:
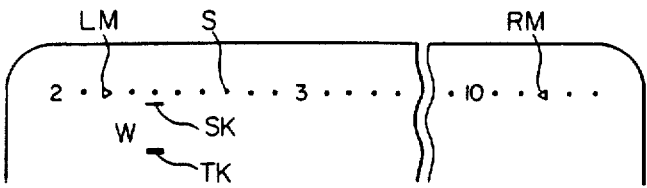

Assume now the character "W" (character printing pitch of 16) is input as shown in FIG. 4, the corresponding character code is then stored in the text memory and also in the address specified by the text cursor TK within the video RAM 50, so that the character "W" comes up on line 1, column 23 of the text area on the CRT 70. In this embodiment, the standard spacing is assumed at 10 pitch and the characters are all displayed on the screen at equal spacing of 10 pitch. The text cursor TK and the scale cursor SK are both moved to column 24 on the same line.

Figure 2:
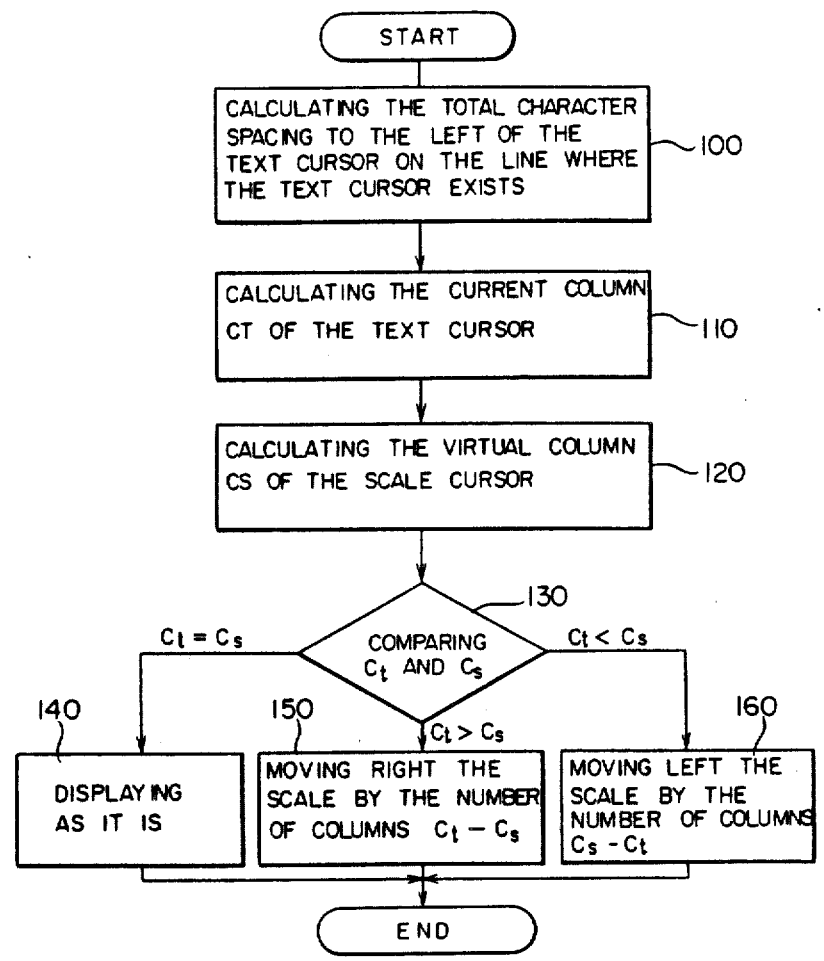
FIG. 2 is a flow chart indicating the operation for cursor movement processing.

At this time, the CPU 20 runs the program shown in FIG. 2. First, in step 100, the character spacing data (printing spacing) for the character "W" which is stored in the ROM 30 is read out to be added to the data from the total character spacing counter 44. Because the data within the total character spacing counter 44 has been 0 in this example, the resultant value in the total character spacing counter 44 is 16 pitch (equal to the spacing of the "W"). Such data in the total character counter 44 is cleared upon change of the line.

In the next step 110, the current column Ct (column 24) of the text cursor TK is calculated from the data within the text cursor pointer 42.

In step 120, the total character spacing data is taken from the total character spacing counter 44. This value (16 pitch) is divided by the standard spacing (10 pitch) to provide a quotient (1, decimal places cur away). The current column (24) of the scale cursor SK is given by adding this quotient plus 1 to the column (22) on which the left margin LM currently exists. The scale cursor SK is then moved to this column. Because the scale S by no means scrolls horizontally relative to the text area at this time, the current position of the scale cursor SK becomes a virtual column Cs.

The step 130 is to compare the current column Ct (column 24) of the text cursor TK given in step 110 with the virtual column Cs (column 24) of the scale cursor SK given in step 120.

The program goes to the step 140 because the current column Ct of the text cursor TK and the virtual column Cs of the scale cursor SK are equal in this example. In step 140, the scale S is displayed on the screen of CRT 70 without any movement and 0 is stored in the scale move counter 45, because the scale S is not moved.

Figure 5:
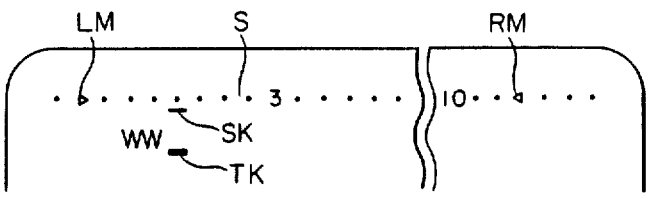

When another character "W" is input, the character code is stored in the address specified by the text cursor in the video RAM 50 in the manner described above, while on the screen of CRT 70, this "W" is shown on the same line but on the column next (24) to the "W" displayed previously. The text cursor TK is displayed on the same line, column 25 (FIG. 5).

Then the CPU 20 again runs the program shown in FIG. 2.

Returning to the step 100, the character spacing data for the character "W" stored in the ROM 30 is read out and is added to the data from the total spacing counter 44 (16 pitch). The value within the total spacing counter is now 32 pitch.

In step 110, the current column Ct (column 25) of the text cursor TK is calculated from the data within the text cursor pointer 42.

In step 120, the total spacing data is taken from the total character spacing counter 44. This value (32 pitch) is divided by the standard spacing (10 pitch) to provide a quotient (3). The current column (26) of the scale cursor SK is given by adding the quotient plus 1 to the current on which the left margin LM exists. The scale cursor SK is thus displayed on column 26. Because the scale S does not move at this time, the current column of the scale cursor SK is a virtual column Cs.

The step 130 is to compare the current column Ct (25) of the text cursor TK given in step 110 with the virtual column Cs (26) of the scale cursor SK given in step 120. With the result of Ct<Cs, the step 160 is now entered.

In step 160, the data within the video RAM 50 is re-written so that the scale S on the CRT 70 screen is moved to the left by the difference between the virtual column Cs of the scale cursor SK and the current column Ct of the text cursor TK. The scale cursor SK and the text cursor TK are thus brought into alignment on the screen as illustrated in FIG. 5. Also, the scale move counter 45 receives the data "−1 column" which indicates that the scale S has been moved to the left by one column.

Figure 6:
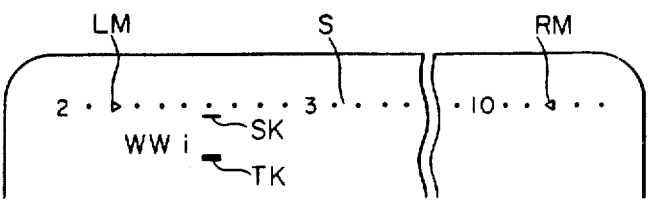
Figure 7:
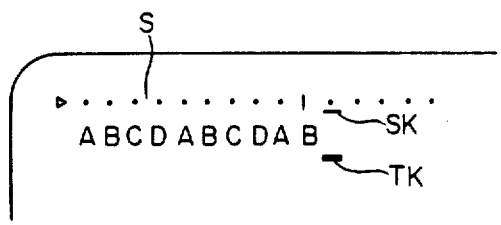
FIGS. 7 to 11 are illustrative views of the display screen in a prior art device.
Figure 8:
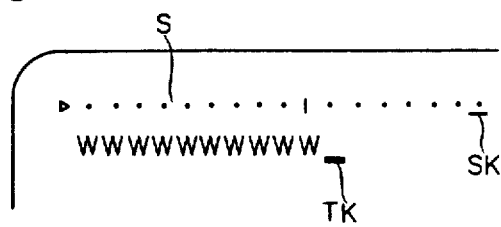
Figure 9:
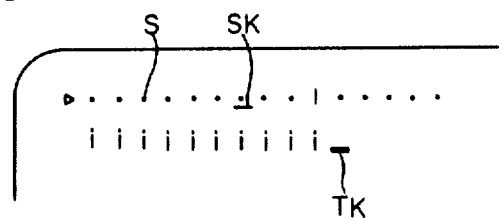
Figure 10:
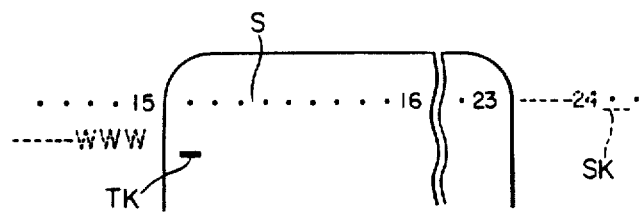
Figure 11:
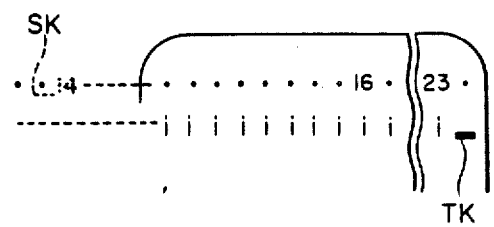

When the character "i" is consecutively inputted, the character code is written in the address specified by the text cursor TK in the video RAM 50, while on the CRT 70 screen, this "i" is shown on the same line but on the column next (25) to the "W" displayed previously (FIG. 6). The text cursor TK is displayed on the same line, column 26.

Then the CPU 20 once again runs the program shown in FIG. 2.

In step 100, the character spacing data (6 pitch) for the character i stored in the ROM 30 is read out and is added to the data (32 pitch) from the total spacing counter 44. The value within the total spacing counter is now 38 pitch.

In step 110, the current column Ct (column 26) of the text cursor TK is calculated from the data within the text cursor pointer 42.

In step 110, the total spacing data is taken from the total character spacing counter 44. This value (38 pitch) is divided by the standard spacing (10 pitch) to provide a quotient (3). The current column (26) of the scale cursor SK is given by adding the quotient plus 1 to the current column on which the left margin LM exists. The scale cursor SK is thus displayed on column 26. The data (−1 column) is taken from the scale move counter 45 in step 120. This value is added to the current column (26) mentioned above to calculate the virtual column Cs (25) of the scale cursor SK.

The step 130 is to compare the current column Ct (26) of the text cursor TK given in step 110 with the virtual column Cs (25) of the scale cursor SK given in step 120. With the result of Ct Cs, the step 150 is now entered.

In step 150, the data within the video RAM 50 is re-written so that the scale S on the CRT 70 screen is moved to the right by a difference (only 1 column) between the virtual column Cs of the scale cursor SK and the current column Ct of the text cursor TK. The scale cursor SK and the text cursor TK are thus brought into alignment on the screen as illustrated in FIG. 6. Also, the scale move counter 45 receives the adding data "1column" which indicates that the scale S has been moved to the right by one column, rendering the counter data 0 column.

As fully explained above, every time the PS type such as "W" or "i" is inputted, the processing as described above takes place to move the scale S horizontally so that the text cursor TK and the scale cursor SK comes into alignment.

Here, if the scale cursor SK reaches the right margin RM or the line feed (return) signal is entered, the scale cursor SK is returned to the first column 23 and the text cursor TK is moved to column 23 on the next line. This processing is repeated upon every entry of character data.

The scale cursor SK is in this example displayed on the current column Ct immediately after the current column Ct is calculated in step 110. Instead, the scale cursor SK can be displayed on the virtual column Cs upon completion of the scale movement in step 140, step 150 and step 160.

It is of course possible to apply the data processing device according to this embodiment to other apparatus such as computers.

With the above embodiment, scale movement is controlled so that the column on the data entry position coincides with the column on the scale which indicates the position on a printing medium corresponding to the data entry position on a display medium. This allows operators to easily grasp the actual printing position on the printing medium while entering data.

FIG. 12 shows a flow chart of another program embodying the invention. This program is for changing a format during editing a text.

In this processing, when the page key (= format change key) on the keyboard 10 is pressed as indicated in Step S201, the screen 203 illustrated in FIG. 13 of the CRT 70 enters the line-format setting mode. When this line-format setting mode is entered, the text area 231 of the screen 203 is brought to standstill, while the scale line 233 in the format area 232 is controlled to be freely movable. The CPU 20 starts key scanning in S203 and, when it determines in S204 that the left or right scale cursor move key on the keyboard 10 has been pressed, it moves the pointer of the scale cursor 234 within the RAM 40, as indicated in S205.

It then determines in S206 whether the position to which the scale cursor 234 has been moved is outside the screen 203 of the CRT 70, in accordance with the cursor current position memory 47 and format data memory 48. If the position of the scale cursor 234 is found to be outside the screen 203, it controls the scale line 233 to horizontally scroll by 20 columns (See FIG. 14) so that the moved position of the scale cursor 234 be within the screen 203, then going to S208. If on the other hand, the moved position of the scale cursor 234 is found to be within the screen 203 in S206, it directly goes to the processing in S208. The aforementioned S203 resumes after the scale cursor 234 has been moved on the CRT 70 in S208.

If, as a result of key scanning S203, the CPU 20 determines in S204 that the scale cursor move key has not been depressed, it examines if any set key to be described below has been depressed down in S209. When there is some set key depressed, the form corresponding to the operation of the set key is set in S210, then returning to S203. When the left margin set key is found to be down in S209, the left margin 235 is set on the CRT 70, while when the right margin set key is found to be down, the right margin 236 is set likewise. If the left and right margins 235 and 236 are already set, the set margins are canceled to enter the latest ones in the ram 40. The tab 237 and/or the decimal tab 238 are set when the keys therefor are found to be down respectively. Also, the hot zone is set if the key therefor is found to be down and the line spacing is altered if the key therefor is found to be down. Furthermore, the pitch and scale line are altered when the key therefor is found to be down, the tab 237 at the cursor position is cleared and all the tabs 237 and 238 are cleared if the keys therefor are found to be down, respectively.

When the escape key is found to be down in S211, all the line forms set are canceled to clear the line format setting mode, as indicated in S212, the step then going to S216. When the step S213 determines that the page key depressed in S201 as above has been depressed again, the line format is registered and the line format register mode is then cleared in S214. The next S215 allows the pertaining text to be reformed according to the line format registered. Now is S216, the scale cursor 234 moves to the position on scale line 233 which corresponds to the text cursor 239 in the text screen 231. This finally allows escaping to another routine. At this time, the text screen 231 as well as the scale line 233 horizontally scroll as required.

With the processing as described above, in the line format setting mode, the text screen 231 is kept at standstill even if the scale cursor 234 is moved. This provides two effects, one being that the operator suffers a minimum eyestrain because of reduced flicker of screen and the other being that the processing time with the internal circuit is shortened to allow the next keystroke to be entered without an undersirable lagtime, resulting in a shorter time for editing the text or the like in memory.

What is claimed is:

1. In a data processing device comprising input means for inputting character data and format data, display means for displaying the input data and means for processing the input data and displaying the processed input character data on said display means, the improvement comprising:

said display means includes a screen which is separated into (1) a line format area containing a horizontal scale which indicates the input range of one line with character columns corresponding to standard printing spacing and (2) a data display area for displaying processed character input data, and said processing device is further provided with shift means for shifting the data displayed on said line format area relative to the data displayed on said data display area.

2. The data processing device according to claim 1 which further comprises a data memory for storing various data which are entered from said input means, said data displayed in said line format area designates a scale which indicates the input range of one line with its colums corresponding to standard printing spacing, printing means for printing the data onto the printing medium at varying printing space in dependence on the corresponding character width, a printing spacing memory for storing the printing spacing of each character, printing space summing means for calculating the sum of corresponding printing spaces of the characters to be entered from the beginning to a predetermined position of said input range on said display means, column number calculating means for calculating the number of columns by dividing said sum of printing spaces by said standard printing space, and said shifting means comprising means for shifting said scale so that the column which is positioned closer to the end of the line by said number of columns from the column corresponding to the beginning of said input range is placed in a position corresponding to said predetermined position.

3. The data processing device according to claim 2 which further comprises
   means for calculating the total width of the characters positioned to the left of a text cursor position on a line where the text cursor exists;
   means for calculating the column where the text cursor exists;
   means for calculating the column where the scale cursor exists;
   means for comparing said columns of the text cursor column and the scale cursor column;
   means for shifting the scale cursor toward right on the display screen when the column of the text cursor is larger than the column of the scale cursor; and
   means for shifting the scale cursor toward left when the column of the cursor is smaller than the column of the scale cursor.

4. In a data processing device comprising input means for inputting character data and format data, display means for displaying the input data and means for processing the input data and displaying the processed character input data on said display means, the improvement comprising:
   said display means includes a screen which is separated into (1) a line format area containing a horizontal scale which indicates the input range of one line with character columns corresponding to standard printing spacing and (2) a data display area for displaying processed character input data, and said processing device is further provided with shift means for shifting the data displayed on said line format area relative to the data displayed on said data display area to stand still while making the screen in said line format area moveable when a format setting mode is entered.

5. The data processing device according to claim 4, wherein a scale for indicating the position of margins and tabs and a cursor movable along said scale are displayed on the screen of said line format area and, when said cursor moves outside the screen of said line format area, the whole scale is horizontally moved together with the cursor movement.

6. The data processing device according to claim 5 further comprising means for reforming the character data based upon the newly set format, and means for shifting the scale line to meet with the text data displayed on the screen.

* * * * *